US012767516B2

(12) United States Patent
Knopf et al.

(10) Patent No.: US 12,767,516 B2
(45) Date of Patent: Oct. 20, 2026

(54) FOLLOWER PLATE

(71) Applicant: Atlas Copco IAS GmbH, Bretten (DE)

(72) Inventors: Marco Knopf, Malschenberg (DE); Rafael Seel, Kraichtal (DE)

(73) Assignee: Atlas Copco IAS GmbH, Bretten (DE)

( * ) Notice: Subject to any disclaimer, the term of this patent is extended or adjusted under 35 U.S.C. 154(b) by 85 days.

(21) Appl. No.: 18/935,761

(22) Filed: Nov. 4, 2024

(65) Prior Publication Data

US 2025/0153997 A1 May 15, 2025

(30) Foreign Application Priority Data

Nov. 13, 2023 (DE) ..................... 10 2023 131 450.5

(51) Int. Cl.
*B67D 7/64* (2010.01)
*B67D 7/32* (2010.01)

(52) U.S. Cl.
CPC ........... *B67D 7/645* (2013.01); *B67D 7/3227* (2013.01)

(58) Field of Classification Search
CPC ........ F04B 53/12; B67D 7/3227; B67D 7/645
See application file for complete search history.

(56) References Cited

U.S. PATENT DOCUMENTS 10,527,228 B2 * 1/2020 Holman .................. F16N 37/00
10,639,752 B2 * 5/2020 Rasmussen ........... B25B 27/062
2015/0375185 A1 * 12/2015 Waizenauer ............ B01F 23/40 366/151.1
2023/0249215 A1 8/2023 Enderle et al.

FOREIGN PATENT DOCUMENTS

DE 102017215706 A1 * 3/2019 ............. B05C 11/10
DE 10 2020 127 440 A1 2/2022

OTHER PUBLICATIONS

German Office Action dated Jun. 21, 2024 in German Application No. 10 2023 131 450.5, with English translation of the relevant parts.

* cited by examiner

*Primary Examiner* — Timothy L Maust
(74) *Attorney, Agent, or Firm* — Collard & Roe, P.C.

(57) ABSTRACT

A follower plate is configured for closing off a container for viscous material, which container is open toward the top, has a container bottom and a container wall that extends upward from the container bottom, which plate can be moved in the direction toward the container bottom, lying against an inner surface of the container wall, which surface faces the container interior, and which plate has a plate body in which a material outlet is arranged for conveying the viscous material out of the container, and at least one ventilation opening is arranged for conducting air out of the container. A valve seat of a ventilation valve, firmly connected to the plate body, is arranged in each ventilation opening.

12 Claims, 4 Drawing Sheets

FOLLOWER PLATE

CROSS REFERENCE TO RELATED APPLICATIONS

Applicant claims priority under 35 U.S.C. § 119 of German Application No. 10 2023 131 450.5 filed Nov. 13, 2023, the disclosure of which is incorporated by reference.

BACKGROUND OF THE INVENTION

1. Field of the Invention

The invention relates to a follower plate for closing off a container that is open toward the top.

2. Description of the Related Art

A follower plate of the type stated initially is known, for example, from DE 10 2020 127 440 A1. It is a component of an apparatus for conveying viscous material from barrel-like containers that are open toward the top. For conveying the material, the follower plate is introduced into a container from above and, lying on the surface of the material situated in the container, is subsequently moved, in a manner sealed against the inner surface of the container wall, toward the container bottom, resting on the decreasing material level as the container is emptied, until the container has been emptied. Once the container has been emptied, the follower plate is removed from it and introduced into a different, full container. The follower plate has a plate body, the underside of which rests on the material situated in the container, and in which a material outlet is arranged, through which the material is conveyed out of the barrel by means of a conveyor pump. In order to allow the air enclosed between the surface of the material and the underside of the plate body to escape, before the conveying process starts, at least one ventilation opening is arranged in the plate body. When no air is present in the container any longer, the ventilation opening must be tightly sealed, so that no viscous material exits from it or air enters back into the container. For this purpose, each ventilation opening is provided with a ventilation valve, which can close off and release the ventilation opening. In most cases, a vacuum pump is also connected to the ventilation opening.

However, since viscous material can penetrate into the ventilation opening, in small amounts, during the ventilation process, there is a need to clean the ventilation valves regularly to remove contamination with the viscous material. This requires time and effort.

SUMMARY OF THE INVENTION

It is therefore the task of the invention to further develop a follower plate of the type stated initially, in such a manner that easier cleaning is possible.

This task is accomplished by means of a follower plate having the characteristics according to the invention. Advantageous further developments of the invention are discussed below.

The invention is based on the idea of integrating a valve seat into every ventilation opening and firmly connecting it to the plate body. The valve seat is therefore not part of a valve unit that is releasably mounted on the plate body, but rather an integral component of the plate body. In this regard, it is preferred that each of the valve seats is pressed into the plate body with force fit, so that it is held in the plate body by friction. It is practical if each of the valve seats is produced from a plastic, so that it is soft, on the one hand, and inexpensive to produce, on the other hand. Contaminated valve seats can then be easily removed from the plate body by means of a chip-removing method, in particular using a drilling tool. Furthermore, it is preferred that each of the valve seats has a conical contact surface for a valve needle. This allows good sealing, in particular by means of a valve needle made from a hard material.

For sealed closing-off of the at least one ventilation opening, it is practical if it is provided that each ventilation opening has a valve unit assigned to it, which unit has a valve needle for closing off the ventilation opening at its valve seat, and an activation device for moving the valve needle between a closed position, in which it sits on the valve seat accommodated in the ventilation opening, forming a seal, and an open position, in which it is lifted up off the valve seat. It is practical if each valve unit has a valve housing, through which housing a ventilation channel that empties into the ventilation opening in question extends, and out of which housing the valve needle projects, at least in the closed position. In particular, it is preferred that the distance by which the valve needle projects out of the valve housing in the closed position amounts to at least one-third, preferably at least half the thickness of the plate body between its underside and a top side on which the valve housing sits. The valve housing is then arranged at a distance from the valve seat, so that it is contaminated less by the viscous material. It is practical if the valve needle is produced from hard metal, which has great hardness, is resistant to chemicals, and is easy to clean. In this regard, a hard metal is understood to be a metal-matrix composite material, in which hard substances present in particle form are held together by means of a matrix composed of metal. Possible hard substances that can be used are, in particular, metal carbides or metal nitrides, such as tungsten carbide, titanium carbide, titanium nitride, niobium carbide, tantalum carbide or vanadium carbide. In particular, each valve unit is releasably fastened to the plate body, so that it can be removed from the plate body as a whole and without being damaged. As the result of these measures, the expensive components of the valve in question, which are brought together in the valve unit, namely the valve needle, the valve housing, and the activation device, can be released from the plate body as a unit, without great effort, and cleaned. The valve seat, in contrast, which is configured as an inexpensive wear part, remains in the plate body and is removed from the ventilation opening that accommodates it, and preferably destroyed during this process. During maintenance of the follower plate, it is practical if a procedure is followed in which each valve unit is removed from the plate body and cleaned, if necessary, and then each of the valve seats, if necessary, is removed from the ventilation opening that accommodates it, and replaced with a new valve seat, and finally, each of the valve units is releasably attached to the plate body again.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
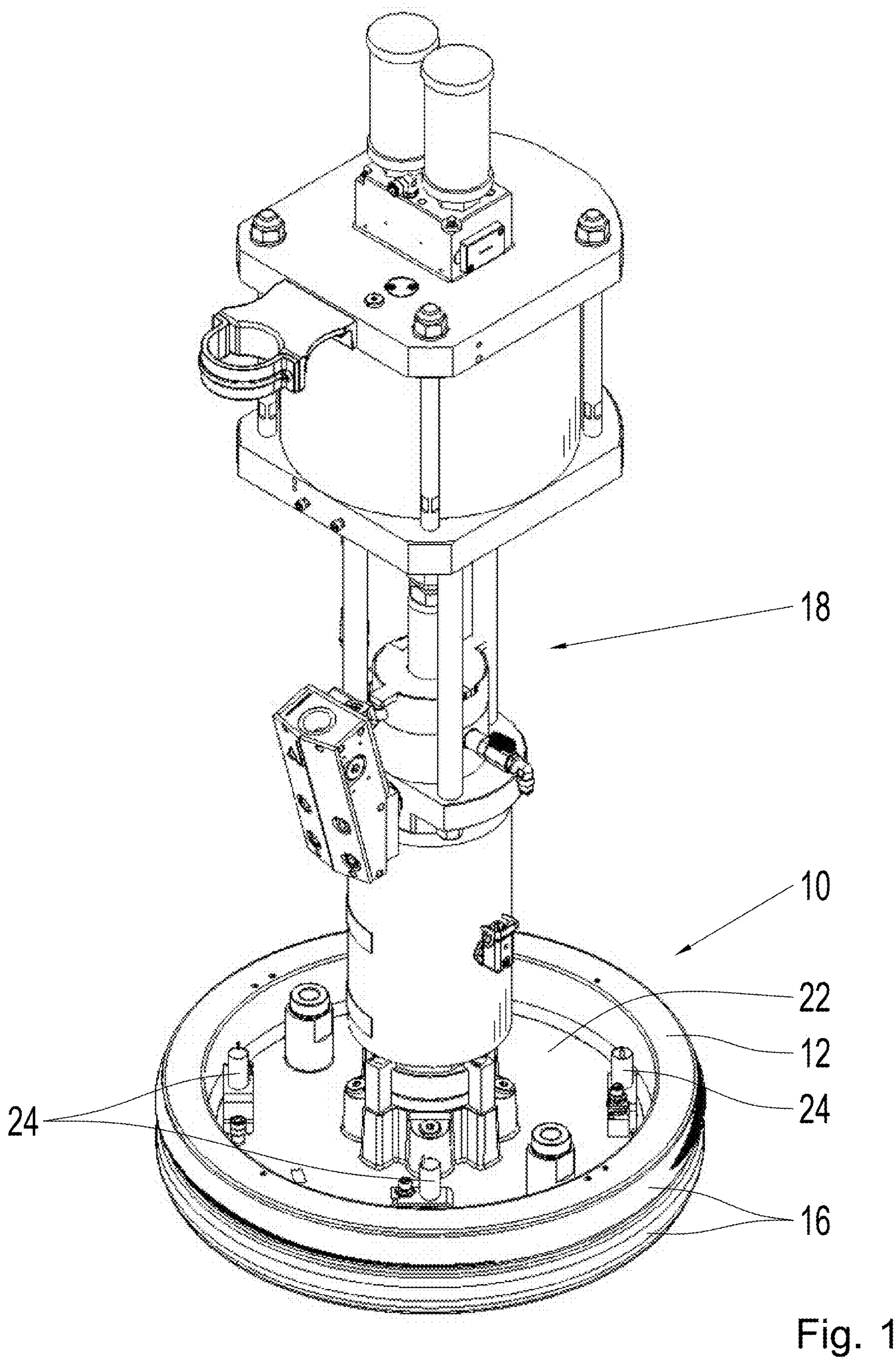
FIG. 1 shows a follower plate with a connected container pump, in a perspective representation.
Figure 2:
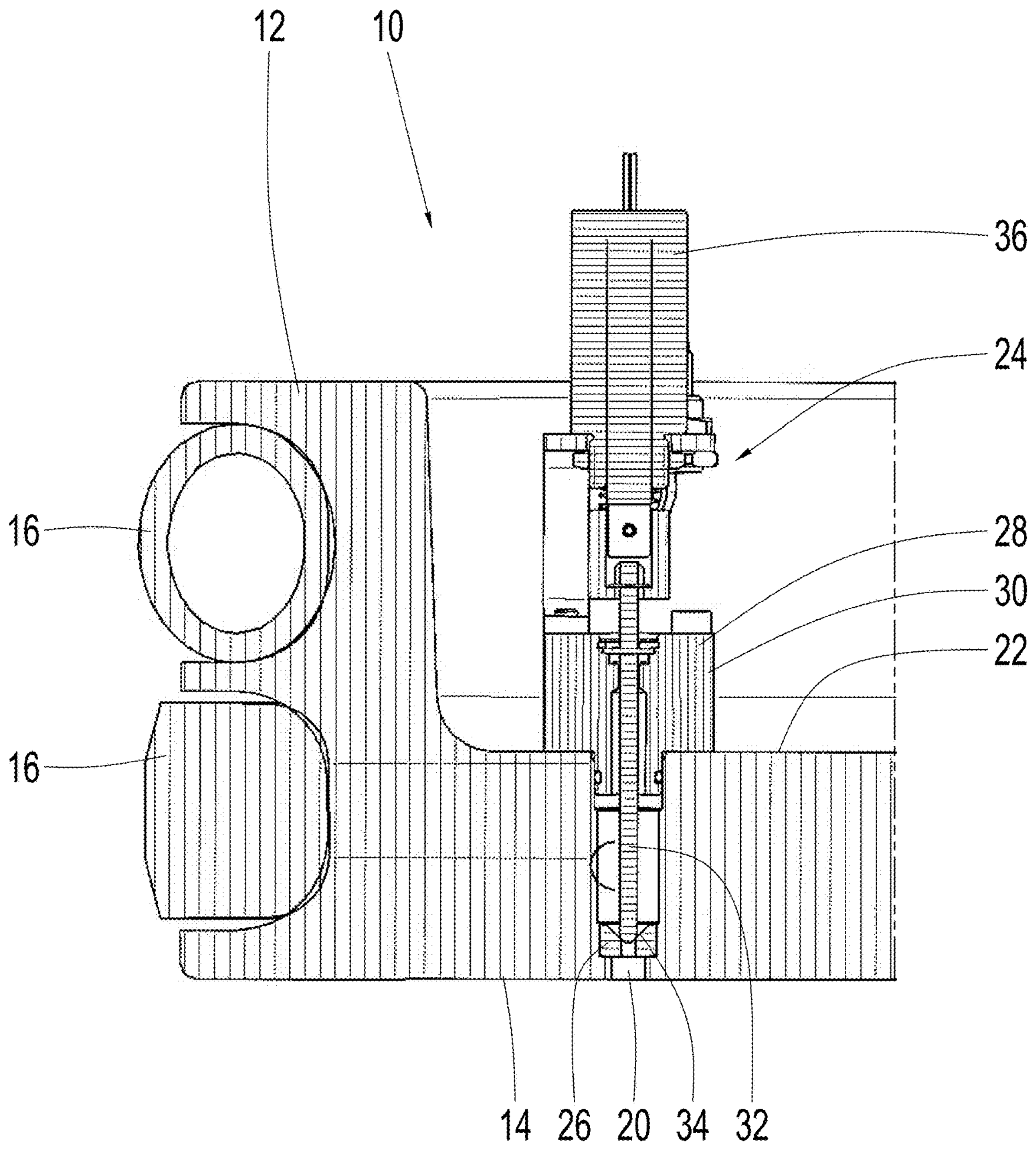
FIG. 2 shows a partial representation of the follower plate according to FIG. 1, in section.
Figure 3:
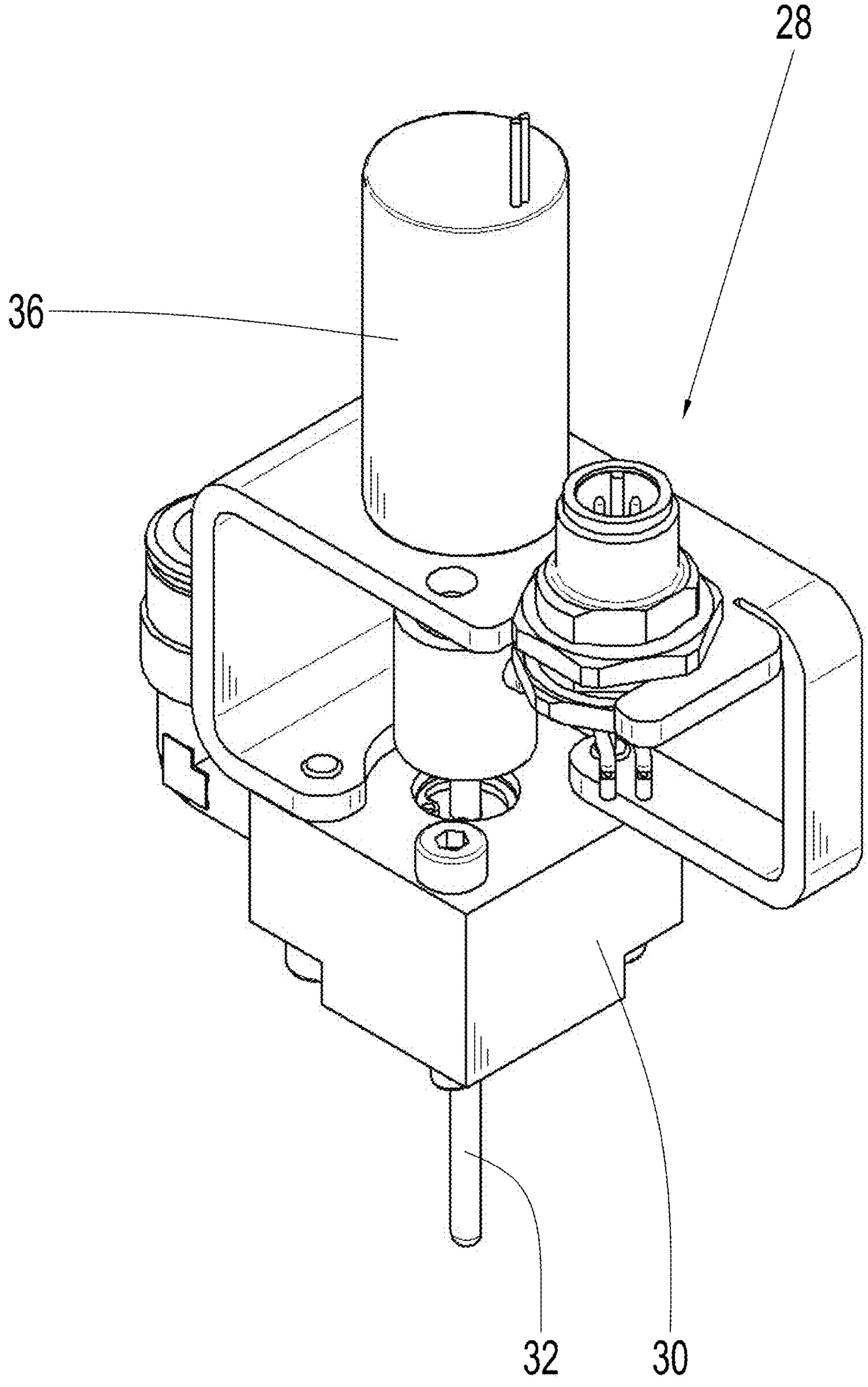
FIG. 3 shows a valve unit in a perspective representation.
Figure 4:
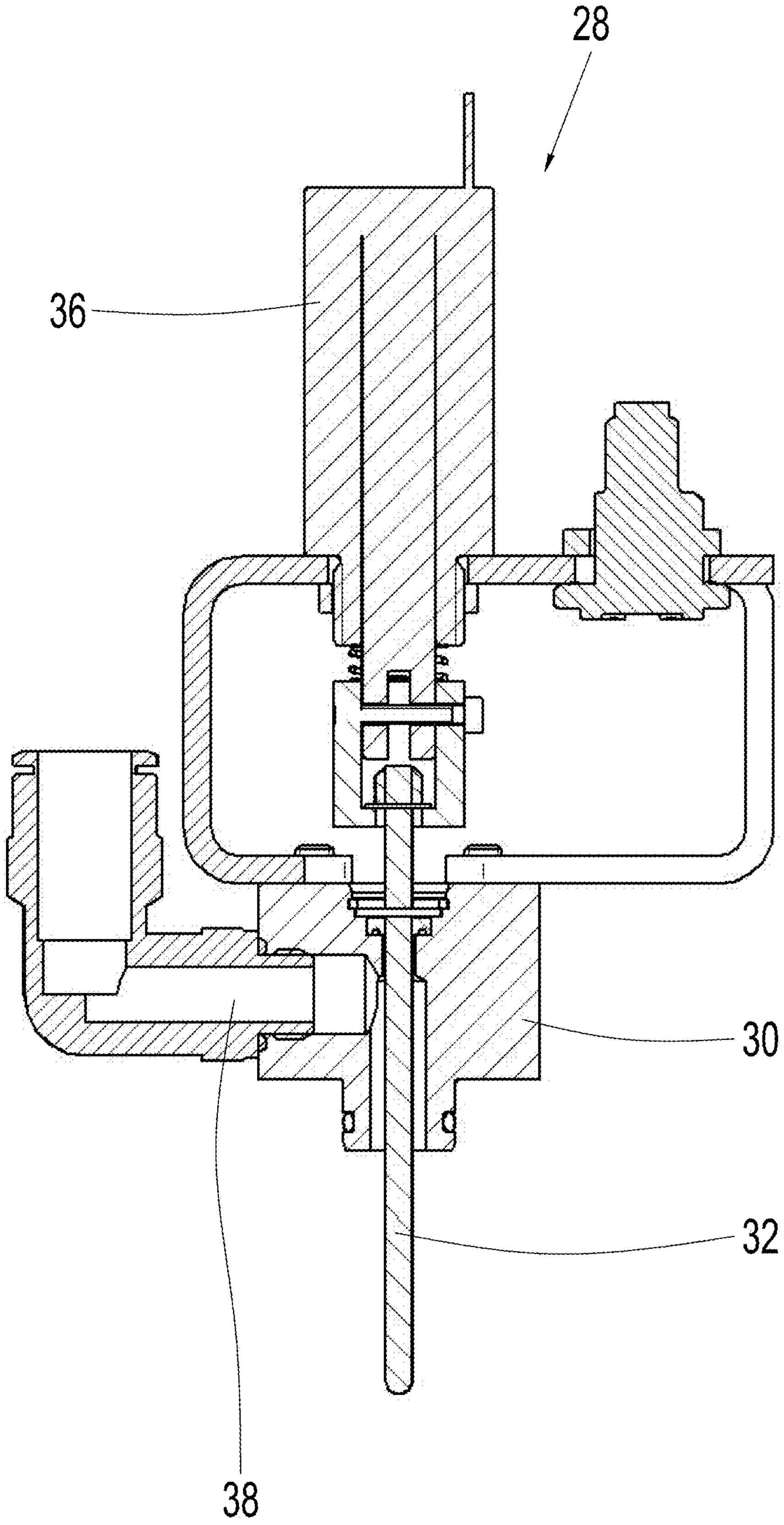
FIG. 4 shows the valve unit according to FIG. 3, in section.

The follower plate 10 shown in the drawing serves for conveying viscous material such as, for example, an adhesive, a sealant, an insulation material or a heat-conductive paste, out of a barrel-like container that is open toward the top, which container is not shown in the drawing. The follower plate 10 is introduced into the container by way of its upper, open side. It has a plate body 12 and presses down, with the underside 14 of the plate body 12, onto the surface of the material contained in the container. The follower plate 10 furthermore has two sealing and wiping rings 16 that run around a mantle surface of the plate body 12, which rings lie against the inner surface of the container wall that faces the container interior, forming a seal, so as to prevent material from exiting out of the container between the container wall and the follower plate 10. The follower plate 10 is moved during the conveying process, following the decreasing material level in the container, in the direction toward the container bottom, until the container has been emptied. The material is conveyed by means of a container pump 18, through a material outlet, not shown in any detail, in the plate body 12.

Several ventilation openings 20 are arranged in the plate body 12, which openings extend between the underside 14 and a top side 22 of the plate body 12 that faces away from the underside 14. At each ventilation opening 20, the follower plate 10 has a ventilation valve 24, which is configured as a needle valve. Each of the ventilation valves 24 has a valve seat 26, made of plastic, which is pressed into the plate body 12 with force fit, as well as a valve unit 28 releasably connected to the plate body 12 by means of screw connections. Each of the valve units 28 has a valve housing 30 and a valve needle 32 that is linearly displaceable in the valve housing 30, which needle projects out of the valve housing 30 and, in a closed position, lies against a conical contact surface 34 of the valve seat 26 in question, forming a seal. Furthermore, each valve unit 28 has an activation device 36, which impacts the valve needle 32, so as to move it from the closed position into an open position in which it is raised up off the valve seat 26. Furthermore, a ventilation channel 38 extends through the valve housing 30, which channel communicates with the ventilation opening 20, in each instance, and to which a vacuum pump can be connected.

During introduction of the follower plate 10 into a container filled with viscous material, the ventilation valves 24 are opened, in that their valve needles 32 are brought into the open position. Air contained in the container can then escape from the ventilation openings 20, or it is actively pumped out by means of a vacuum pump. When there is no longer any air contained in the container between the material surface and the follower plate 10, the ventilation valves 24 are closed and the material is conveyed out of the container by means of the container pump 18. During ventilation, contact of the viscous material with parts of the ventilation valves 24 regularly takes place. These valves can therefore become clogged and wear out over time, due to contamination with the viscous material. During maintenance of the follower plate 10, the valve units 28 are therefore loosened from the plate body 12 and removed. The valve needle 32, which projects out of the valve housing 30 both in the closed position and in the open position, is then easily accessible and can be cleaned in that adhesions of the viscous material are removed from it. The valve seats 26, which, contrary to the valve units 28, cannot be removed from the plate body 12 without destroying or damaging them, can also be cleaned. As a rule, however, they are removed from the plate body 12 by drilling them out, for example, and replaced with new valve seats 26.

In summary, the following should be stated:

The invention relates to a follower plate 10 for closing off a container for viscous material, which container is open toward the top, has a container bottom and a container wall that extends upward from the container bottom, which plate can be moved in the direction toward the container bottom, lying against an inner surface of the container wall, which surface faces the container interior, and which plate has a plate body 12 in which a material outlet is arranged for conveying the viscous material out of the container, and at least one ventilation opening 20 is arranged for conducting air out of the container. According to the invention, it is provided that a valve seat 26 of a ventilation valve 24, firmly connected to the plate body 12, is arranged in each ventilation opening 20.

Although only a few embodiments of the present invention have been shown and described, it is to be understood that many changes and modifications may be made thereunto without departing from the spirit and scope of the invention.

What is claimed is:

1. A follower plate for closing off a container for viscous material, wherein the container is open toward the top, has a container bottom and a container wall that extends upward from the container bottom, wherein the plate can be moved in the direction toward the container bottom, lying against an inner surface of the container wall, wherein the surface faces the container interior, and wherein the plate has a plate body (12) in which a material outlet is arranged for conveying the viscous material out of the container, and at least one ventilation opening (20) is arranged for conducting air out of the container, wherein a valve seat (26) of a ventilation valve (24), firmly connected to the plate body (12), is arranged in each ventilation opening (20), wherein each of the valve seats (26) is an integral part of the plate body (12), and wherein each of the valve seats (26) cannot be removed from the plate body (12) without destroying or damaging it.

2. The follower plate according to claim 1, wherein each of the valve seats (26) is pressed into the plate body (12) with force fit.

3. The follower plate according to claim 1, wherein each of the valve seats (26) is produced from a plastic.

4. The follower plate according to claim 1, wherein each of the valve seats (26) has a conical contact surface (34).

5. The follower plate according to claim 1, wherein each ventilation opening (20) has a valve unit (28) assigned to it, which has a valve needle (32) for closing off the ventilation opening (20) at its valve seat (26), and an activation device (36) for moving the valve needle (32) between a closed position, in which it sits on the valve seat (26) accommodated in the ventilation opening (20), forming a seal, and an open position, in which it is lifted up off the valve seat (26).

6. The follower plate according to claim 5, wherein each valve unit (28) has a valve housing (30), through which a ventilation channel (38) that opens into the ventilation opening (20) in question extends, and from which the valve needle (32) projects, at least in the closed position.

7. The follower plate according to claim 6, wherein the distance by which the valve needle (32) projects out of the valve housing (30) in the closed position amounts to at least one-third, preferably at least half of the thickness of the plate body (12) between its underside (14) and a top side (22) on which the valve housing (30) sits.

8. The follower plate according to claim 5, wherein each valve needle (32) is produced from hard metal.

9. The follower plate according to claim 5, wherein each valve unit (28) is releasably fastened to the plate body (12).

10. A method for maintenance of a follower plate for closing off a container for viscous material, wherein the container is open toward the top, has a container bottom and a container wall that extends upward from the container bottom, wherein the plate can be moved in the direction toward the container bottom, lying against an inner surface of the container wall, wherein the surface faces the container interior, and wherein the plate has a plate body (12) in which a material outlet is arranged for conveying the viscous material out of the container, and at least one ventilation opening (20) is arranged for conducting air out of the container, wherein a valve seat (26) of a ventilation valve (24), firmly connected to the plate body (12), is arranged in each ventilation opening (20), wherein each ventilation opening (20) has a valve unit (28) assigned to it, which has a valve needle (32) for closing off the ventilation opening (20) at its valve seat (26), and an activation device (36) for moving the valve needle (32) between a closed position, in which it sits on the valve seat (26) accommodated in the ventilation opening (20), forming a seal, and an open position, in which it is lifted up off the valve seat (26), wherein each valve unit (28) is releasably fastened to the plate body (12), wherein the at least one valve unit (28) is removed from the plate body (12), wherein the at least one valve seat (26) is removed from the ventilation opening (20) that accommodates it and replaced with a new valve seat (26), and wherein the at least one valve unit (28) is once again releasably fastened to the plate body (12).

11. The method according to claim 10, wherein the at least one valve seat (26) is destroyed when it is removed from the ventilation opening (20) that accommodates it.

12. The method according to claim 11, wherein the at least one valve seat (26) is removed from the ventilation opening (20) that accommodates it, by means of a chip-removing method.

* * * * *